UNITED STATES PATENT OFFICE.

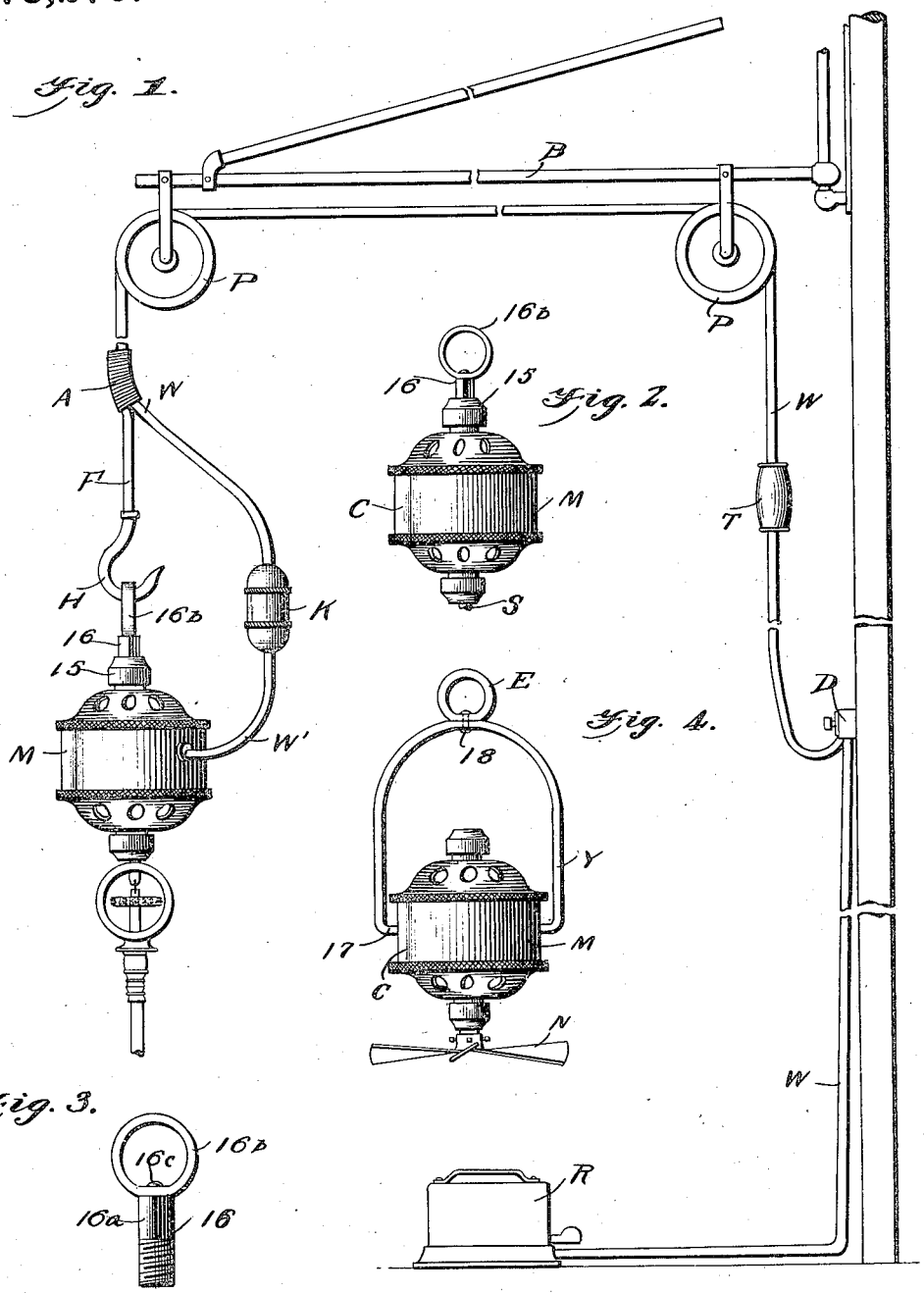

JAMES AUSTIN ANDERSON, OF CHICKASHA, OKLAHOMA.

PORTABLE MOTOR.

1,375,270.    Specification of Letters Patent.    Patented Apr. 19, 1921.

Application filed May 26, 1920. Serial No. 384,419.

*To all whom it may concern:*

Be it known that I, JAMES AUSTIN ANDERSON, a citizen of the United States, and a resident of Chickasha, in the county of Grady and State of Oklahoma, have invented certain new and useful Improvements in Portable Motors, of which the following is a specification.

My invention relates generally to portable motors such as are used in connection with dental engines, portable fans and the like, and particularly to a suspension bracket therefor whereby a motor can be suspended from any suitable support to actuate devices of various characters. My invention is particularly adapted for use as a dental engine, the motor being relatively small to permit of its free movement from place to place but of sufficient power to actuate dental tools of various characters. The motor casing has attached thereto a suspension bracket which is so constructed as to permit of its being attached to any standard form of support, thus allowing of the suspension of the motor at various points within a dental office.

I will describe one form of motor and two forms of suspension brackets embodying my invention and will then point out the novel features thereof in claim.

Figure 1 is a view showing a standard form of dental engine bracket having applied thereto one form of motor and suspension bracket embodying my invention.

Fig. 2 is a detailed view of the motor and that portion of the suspension bracket carried thereby.

Fig. 3 is a detailed view of a portion of the suspension bracket carried by the motor.

Fig. 4 is a view showing in side elevation a motor similar to the motor shown in the preceding views but having applied thereto another form of suspension bracket embodying my invention.

Similar reference characters refer to similar parts in each of the several views.

Referring specifically to the drawings and particularly to Fig. 2, M designates a motor including a casing C formed at its lower side with a suitable opening through which extends the motor shaft S. To this shaft S any conventional form of flexible shaft can be connected as shown in Fig. 1 for operating any suitable form of dental tool. The upper side of the casing C is provided with a socket 15 screw threaded internally to receive a head 16 which as illustrated to advantage in Fig. 3 comprises a screw threaded shank portion $16^a$ upon the upper end of which is pivotally mounted a ring $16^b$, such ring being pivotally secured to the shank by means of a fastening member $16^c$.

The socket 15 and the head 16 constitute the suspension bracket for supporting the motor M in vertical position upon any suitable support, it being understood that such support must be provided with some means to permit of the attaching of the ring $16^b$ so that the motor will occupy a vertical position. In Fig. 1, I have shown one form of support embodying my invention which comprises a hook H secured to the lower end of a flexible member F. The flexible member F is secured to conducting wires W by means of cord, tire tape or the like as indicated at A. The conducting wires W are electrically connected to the motor M so as to supply current thereto, and are trained over pulleys P supported upon a conventional form of bracket B. A weight T is secured to the conducting wires for counterbalancing the weight of the motor M as will be understood. The supply of current to the motor M is controlled by a switch D mounted upon a suitable support and the intensity of the current is controlled by a rheostat R.

In the applied position of the motor M to the support, it will be clear that the ring $16^b$ engages the hook H thus supporting the motor in vertical position and in proper position to permit of the free and unrestricted manipulation of the dental tool operated by the motor. In the present instance, the conducting wires W are made up of a relatively long section W and a relatively short section W', the long section is supported by the bracket B while the short section is permanently connected to the motor M. These two sections are connected by a conventional form of connecting plug K so as to permit of the detaching of the section W' from the section W. By this arrangement it will be seen that the motor M can be readily detached from the support when it is desired to use the motor for other purposes. It will likewise be clear that this arrangement permits of the ready application of the motor to the support and the connecting of the section W' to the section W.

Referring now to Fig. 4, I have here shown another form of suspension bracket for the motor M which comprises in the present instance a substantially U-shaped yoke Y having the opposite ends thereof inturned as indicated at 17 and pivotally mounted within suitable openings formed in the casing C. Pivotally secured to the intermediate portion or upper end of the yoke Y by means of a rivet 18 is a ring E, such ring corresponding to the ring 16$^b$ in the first form of suspension bracket and serving to support the motor in vertical position upon any suitable support. The yoke Y being pivotally connected to the casing C permits of a rocking movement of the motor M with respect to the suspension bracket so that it can occupy various positions other than its normal vertical position during the manipulation of dental tools actuated by the motor. In the present instance, the motor M shown in Fig. 4 has a fan N connected thereto to illustrate the various applications to which the motor may be adapted.

Although I have herein shown and described only one form of motor and two forms of suspension brackets embodying my invention, it is to be understood that various changes and modifications may be made herein without departing from the spirit of the invention and the spirit and scope of the appended claim.

What I claim is:

In combination, a motor including a casing, a suspension bracket carried by the casing, a support including pulleys, a conducting wire trained over said pulleys, and connected to said motor, said conducting wires being formed of sections with one of said sections carried by said motor, a flexible member secured to said conducting wires and a hook carried by said flexible member and engaging the suspension bracket for supporting the motor in vertical position.

JAMES AUSTIN ANDERSON.